US008779675B2

(12) United States Patent
Mikani et al.

(10) Patent No.: US 8,779,675 B2
(45) Date of Patent: Jul. 15, 2014

(54) CONTROLLING CURRENT FLOWING THROUGH LEDS IN A LED LIGHTING FIXTURE

(75) Inventors: Vaske Mikani, Senoia, GA (US); Li Li, Peachtree City, GA (US); Christopher Lee Bohler, Peachtree City, GA (US); Scott Edward Rhodes, Sharpsburg, GA (US)

(73) Assignee: Cooper Technologies Company, Houston, TX (US)

( * ) Notice: Subject to any disclaimer, the term of this patent is extended or adjusted under 35 U.S.C. 154(b) by 208 days.

(21) Appl. No.: 13/328,679

(22) Filed: Dec. 16, 2011

(65) Prior Publication Data

US 2012/0153833 A1  Jun. 21, 2012

Related U.S. Application Data

(60) Provisional application No. 61/495,091, filed on Jun. 9, 2011, provisional application No. 61/423,928, filed on Dec. 16, 2010.

(51) Int. Cl.
*H05B 39/02* (2006.01)
*H05B 37/00* (2006.01)

(52) U.S. Cl.
USPC .................................. 315/209 R; 315/185 R

(58) Field of Classification Search
USPC ............ 315/291, 307, 312, 127, 128, 200 R, 315/294, 202, 296, 297, 308, 310, 311
See application file for complete search history.

(56) References Cited

U.S. PATENT DOCUMENTS

| 8,373,363 | B2 | 2/2013 | Grajcar |
| 2006/0256050 | A1 | 11/2006 | Ikeda |
| 2007/0210722 | A1 | 9/2007 | Konno et al. |
| 2009/0160359 | A1 | 6/2009 | Lee et al. |

FOREIGN PATENT DOCUMENTS

JP    2009152518    7/2009

OTHER PUBLICATIONS

International Search Report for PCT/US2011/065519; mailed Aug. 24, 2012.

*Primary Examiner* — Minh D A
(74) *Attorney, Agent, or Firm* — King & Spalding LLP

(57) ABSTRACT

An alternating current ("AC")-powered light emitting diode ("LED") driver is described herein for driving one or more arrays of series-connected LEDs. The LED driver includes a first transistor that includes a collector-emitter path connected in series with at least one LED of an array of series-connected LEDs. The LED driver also includes a second transistor configured to selectively activate the first transistor based on a level of current through the array of series-connected LEDs. The array of series-connected LEDs has a turn-on voltage.

18 Claims, 11 Drawing Sheets

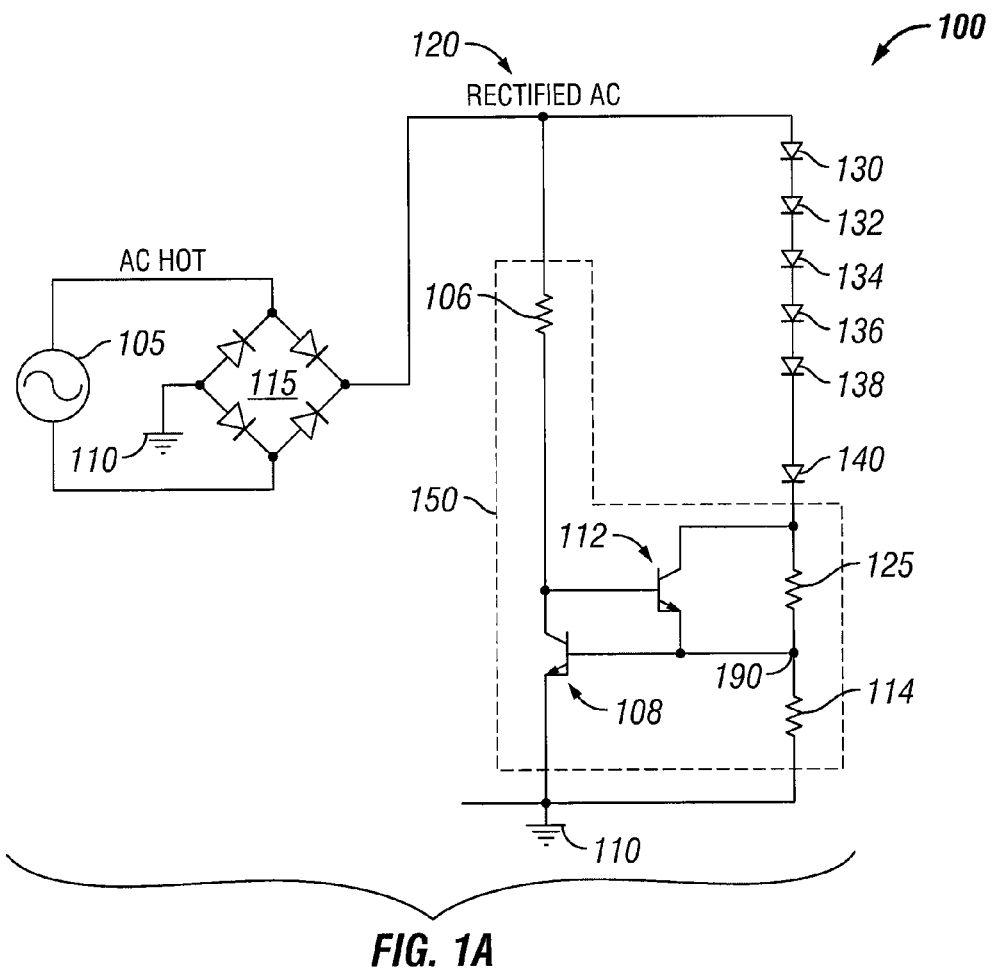
FIG. 1A
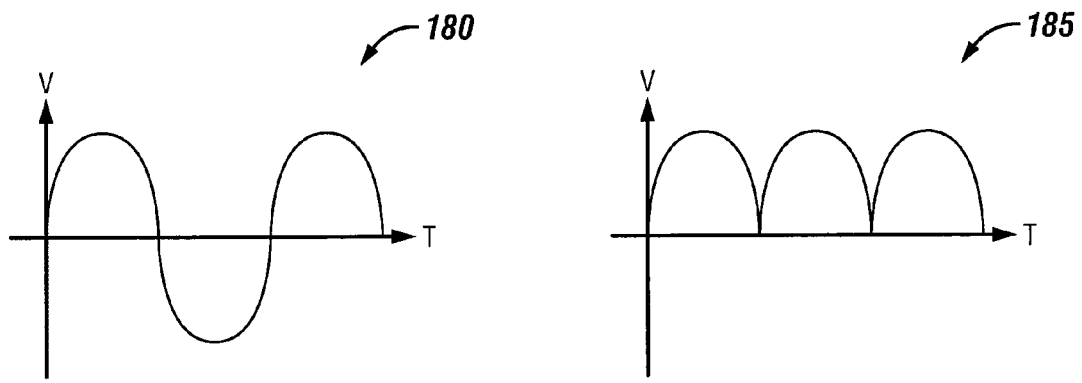
FIG. 1B  FIG. 1C

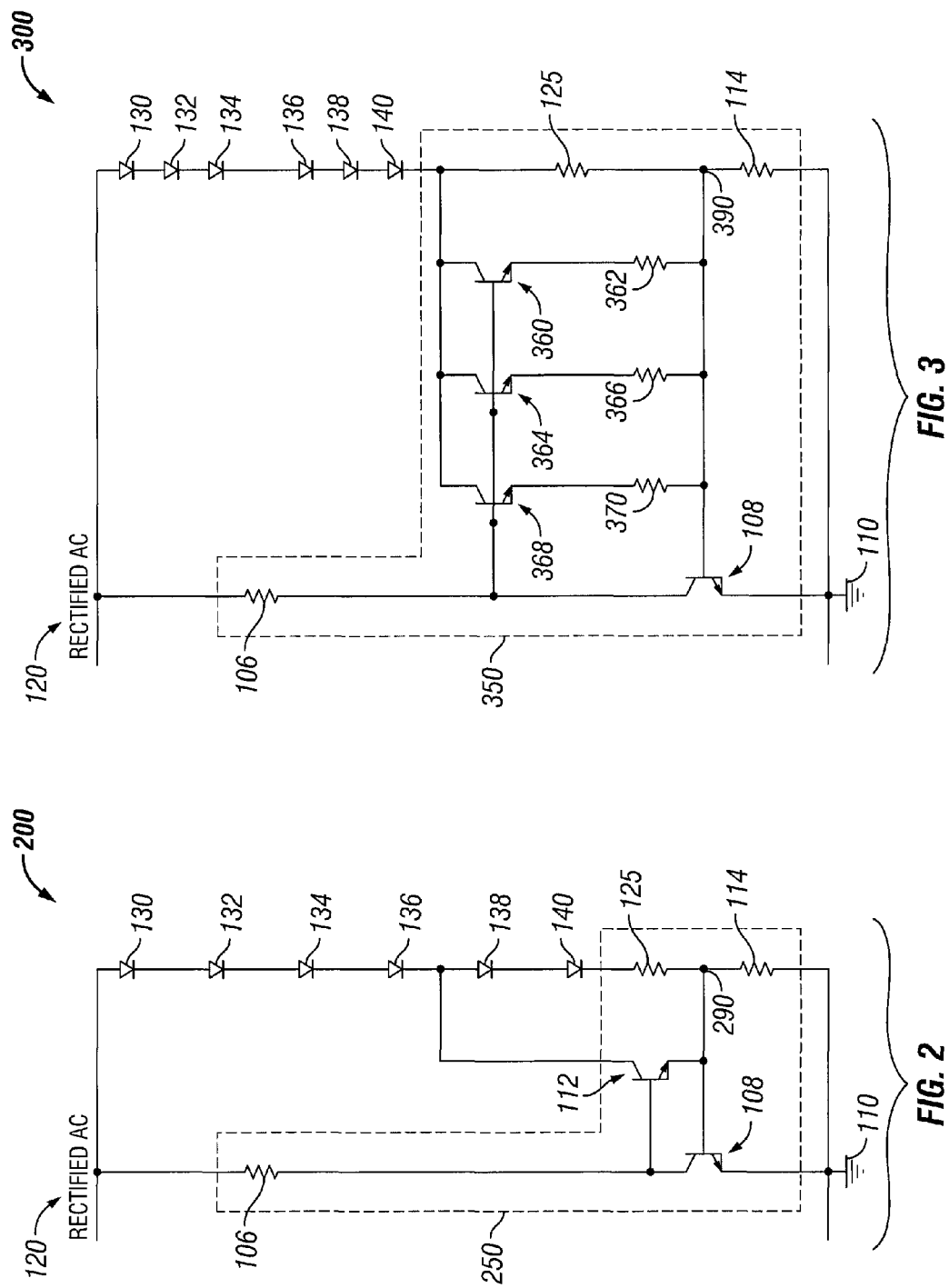

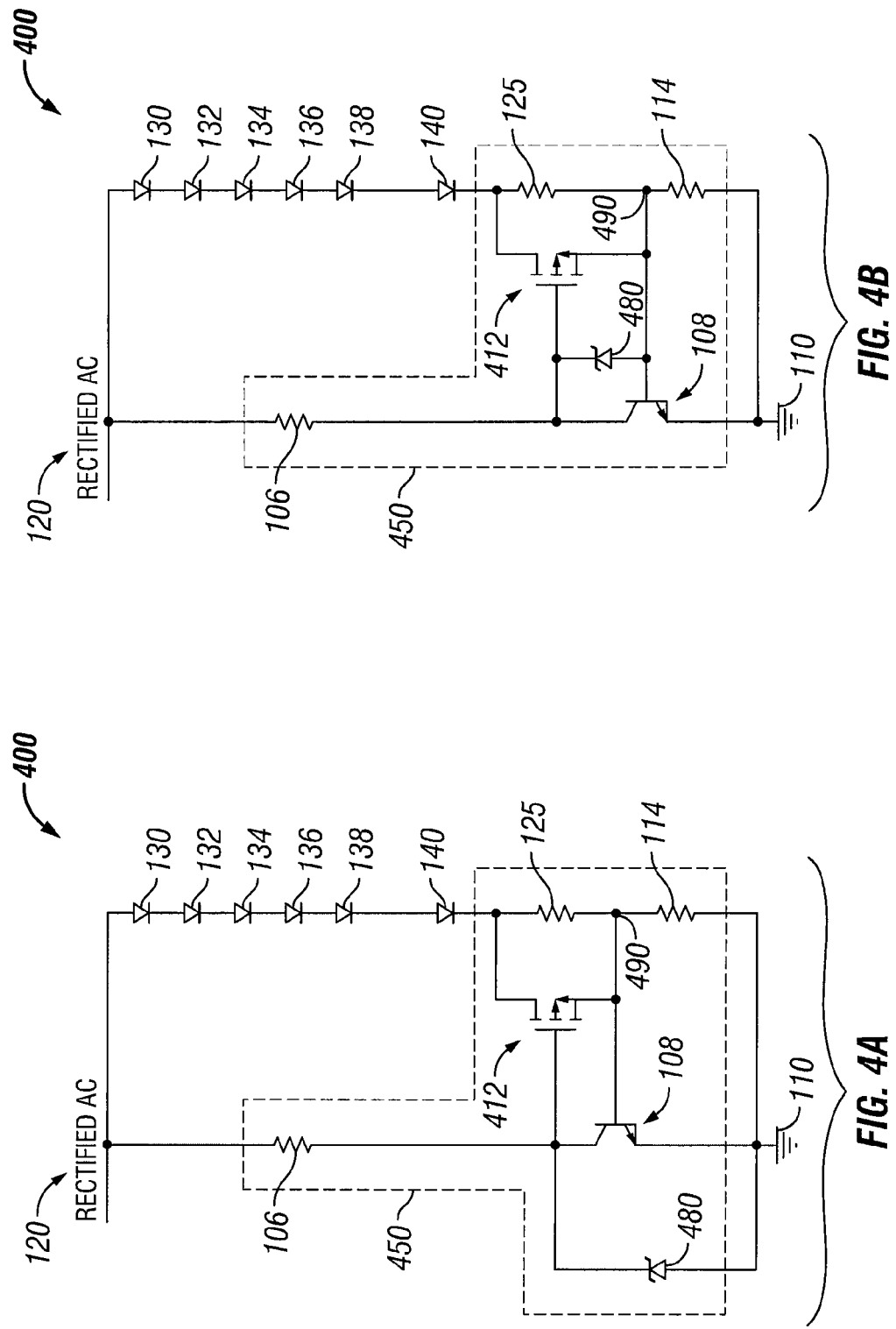

CONTROLLING CURRENT FLOWING THROUGH LEDS IN A LED LIGHTING FIXTURE

CROSS-REFERENCE TO RELATED APPLICATIONS

This application claims priority under 35 U.S.C. §119 to (1) U.S. Provisional Patent Application Ser. No. 61/423,928, titled "AC Powered LED Driver having Reduced Cost and Improved Performance" and filed on Dec. 16, 2010, and (2) U.S. Provisional Patent Application Ser. No. 61/495,091, titled "Reduction of Low Light Output Dimming Flicker and Total Harmonic Distortion in a LED Lighting Fixture" and filed on Jun. 9, 2011, the entire contents of which are hereby incorporated herein by reference.

TECHNICAL FIELD

The present disclosure relates generally to lighting fixtures using light emitting diodes (LEDs) as the light source, and more particularly to reducing low light output dimming flicker and total harmonic distortion (THD) in the LED lighting fixture.

BACKGROUND

The use of lighting fixtures with LEDs is becoming more common. However, the technology with respect to LEDs is evolving. While LED lighting fixtures are generally more energy efficient than lighting fixtures using other types of light sources (e.g., incandescent or fluorescent), there are a number of improvements that can be made to make LED lighting fixtures a more appealing alternative. For example, when the die utilization of a LED is low, the LED may fail sooner than expected. As another example, when a LED lighting fixture is used with a dimming switch, the LED lighting fixture may generate a noticeable flicker effect, particularly when the dimming switch is used for low light output.

SUMMARY

In general, in one aspect, the disclosure relates to an alternating current ("AC")-powered light emitting diode ("LED") driver for driving one or more arrays of series-connected LEDs. The AC-powered LED driver can include a first transistor that includes a first collector-emitter path connected in series with at least a first LED of a first array of the one or more arrays of series-connected LEDs. The AC-powered LED driver can further include a second transistor configured to selectively activate the first transistor based on a level of current through the first array of series-connected LEDs. The first array of series-connected LEDs can have a first turn-on voltage.

In another aspect, the disclosure can generally relate to a method for controlling a light emitting diode (LED) lighting circuit. The method can include applying a first voltage to a first array of series-connected LEDs and a second array of series-connected LEDs of the LED lighting circuit, where the first voltage exceeds a first threshold voltage, and where the first threshold voltage turns on the first array of series-connected LEDs. The method can also include applying, subsequent to applying the first voltage, an increased voltage to the first array of series-connected LEDs and the second array of series-connected LEDs, where the increased voltage exceeds a second threshold voltage, and where the second threshold voltage turns on the second array of series-connected LED and turns off the first array of series-connected LEDs. The method can further include applying, subsequent to applying the increased voltage, a decreased voltage to the first array of series-connected LEDs and the second array of series-connected LEDs, where the decreased voltage is greater than the first threshold voltage and less than the second threshold voltage, and where the decreased voltage turns off the second array of series-connected LED and turns on the first array of series-connected LEDs. The method can also include applying, subsequent to applying the decreased voltage, a second voltage to the first array of series-connected LEDs and the second array of series-connected LEDs, where the second voltage is less than the first threshold voltage, and where the second voltage turns off the first array of series-connected LEDs.

These and other aspects, objects, features, and embodiments will be apparent from the following description and the appended claims.

BRIEF DESCRIPTION OF THE DRAWINGS

The drawings illustrate only exemplary embodiments of reducing low light output dimming flicker and total harmonic distortion (THD) in the LED lighting fixture and are therefore not to be considered limiting of its scope, as reducing low light output dimming flicker and THD in the LED lighting fixture may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

FIG. 1A shows an alternating current ("AC") powered light emitting diode ("LED") lighting circuit in accordance with one or more exemplary embodiments.

FIG. 1B shows an AC sinusoidal voltage waveform provided by an AC source.

FIG. 1C shows a rectified AC supply voltage waveform output by a full wave rectifier.

FIGS. 2 and 3 each show an AC powered LED lighting circuit in accordance with one or more exemplary embodiments.

FIGS. 4A and 4B each show an AC powered LED lighting circuit in accordance with one or more exemplary embodiments.

DETAILED DESCRIPTION OF EXEMPLARY EMBODIMENTS

Figure 5:
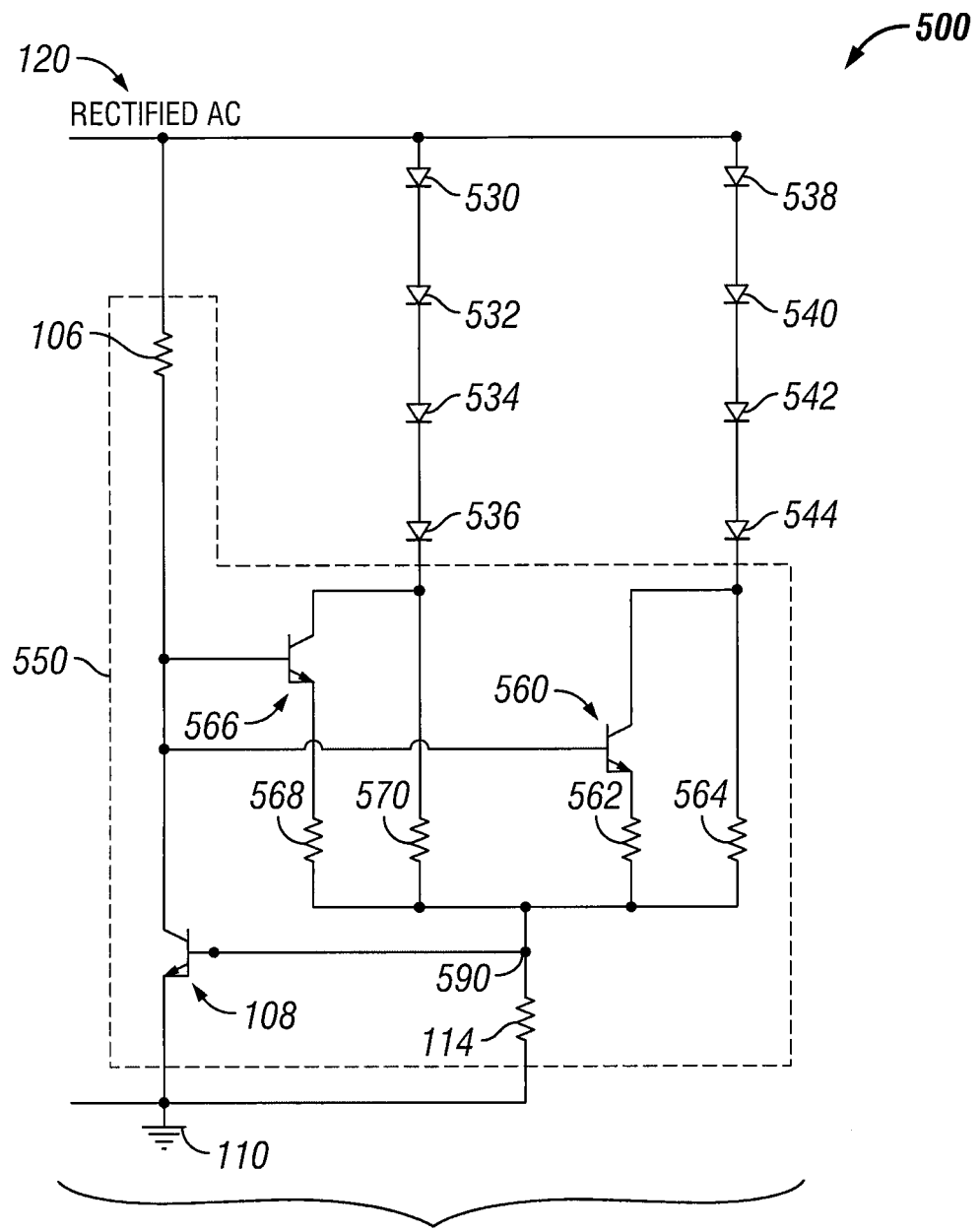
FIG. 5 shows an AC powered LED lighting circuit in accordance with one or more exemplary embodiments.

Exemplary embodiments for reducing low light output dimming flicker and THD in the LED lighting fixture will now be described in detail with reference to the accompanying figures. Like elements in the various figures are denoted by like reference numerals for consistency. In the following detailed description of the exemplary embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The LED lighting circuits described herein may include one or more of a number of different types of LED technology. For example, each LED lighting circuit may be packaged or fabricated on a printed circuit board and/or with chip-on-board technology. Further, the number of LEDs used in various embodiments may be more or fewer than the number of LEDs in the exemplary embodiments described herein. The number of LEDs used may depend on one or more of a number of factors including, but not limited to, the voltage drops of the LEDs selected and the voltage levels of the power source voltages used (e.g., 120 VAC, 240 VAC, 277 VAC). One or more exemplary embodiments may be used with a LED lighting circuit that is dimmable.

In one or more exemplary embodiments, a LED driver may include one or more current limiting circuits. A current limiting circuit may include one or more transistors and/or one or more resistors configured in one of a number of ways. A current limiting circuit may be configured to maintain a maximum current flowing through an array of series-connected LEDs. In such a case, the maximum current may correspond to a voltage, where the voltage is greater than the turn-on voltage for the array of series-connected LEDs. Any components (e.g., transistor, resistor) of a LED lighting circuit described herein may be of a size and type suitable to be used in such LED lighting circuit. The components described herein may be discrete components, part of a semiconductor, and/or part of a software-based control circuit.

FIG. 1A shows an AC powered LED lighting circuit 100 in accordance with one or more exemplary embodiments. Referring now to FIG. 1A, the exemplary circuit 100 includes a LED driver circuit 150, an AC source 105, a rectifier 115, and a single array of series-connected current-regulated LEDs 130-140. Each of these components is described below. Embodiments are not limited to the exemplary configuration shown in FIG. 1A and discussed herein.

In one or more exemplary embodiments, the AC source 105 provides AC power to the LED driver circuit 150 and the array of series-connected current-regulated LEDs 130-140. The AC source 105 may generate any voltage and/or current suitable to operate the LED lighting circuit 100. For example, the AC source 105 may be a 120 $V_{rms}$ (root-mean-square) source commonly found in residential and commercial buildings. As another example, the AC source 105 may be a 24 $V_{rms}$ source obtained through a transformer that converts voltage and provides isolation.

The rectifier 115 is disposed between the AC source 105 and the LED driver circuit 150 and the single array of series-connected current-regulated LEDs 130-140. In one or more exemplary embodiments, the rectifier 115 is configured to convert the power received from the AC source 105 into a form of power used by the LED driver circuit 150 and the single array of series-connected current-regulated LEDs 130-140. For example, the rectifier 115 may be a full wave rectifier 115 that converts the sinusoidal AC from the AC source 105 to a rectified AC supply 120 or direct current ("DC") supply having a constant polarity. The rectifier 115 may be a configuration of multiple diodes (as shown in FIG. 1A), a semiconductor, or any other suitable component or set of components. The rectifier 115 of FIG. 1A is known as a full-wave rectifier. In this example, the rectifier 115 converts a 120 $V_{rms}$ alternating current (VAC) power source 102 into positive voltages.

FIG. 1B depicts an exemplary AC sinusoidal voltage waveform 180 provided by the AC source 105. FIG. 1C depicts an exemplary rectified AC supply voltage waveform 185 output by the rectifier 115 shown in FIG. 1A. Referring to FIGS. 1B and 1C, the voltage level of the rectified AC supply 120 varies with the cycling of the sinusoidal voltage provided by the AC source 105. For example, if the AC source 105 is a typical 120 $V_{rms}$ supply, the voltage level of the rectified AC supply 120 can vary from 0 V to approximately 132 $V_{rms}$ or 187 $V_{peak}$.

In one or more exemplary embodiments, the single array of series-connected LEDs 130-140 (or simply LEDs 130-140), shown in FIG. 1A, are connected in series. An array of series-connected LEDs may be one or more LEDs connected in series so that a current flows through all LEDs in the array. In certain exemplary embodiments, the LEDs 130-140 receive a sinusoidal voltage from the rectifier 115. When the voltage across the LEDs 130-140 exceeds the sum of the forward voltages of the LEDs 130-140, the LEDs 130-140 will conduct current (i.e., the LEDs 130-140 will turn on). As the voltage increases, the current through the LEDs 130-140 also increases.

The LED driver circuit 150 of FIG. 1A also includes a bipolar transistor (also known as a bipolar junction transistor) (i.e., transistor A 112). The collector terminal of transistor A 112 is electrically coupled to the last of the LEDs (i.e., LED 140) in the series of LEDs 130-140. Further, the emitter terminal of transistor A 112 is electrically coupled to a current sensing resistor 114. In one or more exemplary embodiments, the current sensing resistor 114 is also coupled to the current limiting resistor 125. The opposite end of the current sensing resistor 114 is connected to ground 110. As discussed in further detail below, the current sensing resistor 114 may be used, along with a second transistor (i.e., transistor B 108) to activate and deactivate transistor A 112 based on current levels at the current sensing resistor 114.

In one or more exemplary embodiments, the LED driver circuit 150 also includes a transistor biasing resistor 106 connected between the base of transistor A 112 (and so also the collector of transistor B 108) and the rectified AC supply 120. As discussed in further detail below, the biasing resistor 106 provides a bias current at the base of transistor A 112 from the rectified AC supply 120.

In one or more exemplary embodiments, the LED driver circuit 150 includes an optional current limiting resistor 125. In one or more exemplary embodiments, the current limiting resistor 125 is employed in the LED lighting circuit 100 to limit the amount of current flowing through the LEDs 130-140. In particular, the current limiting resistor 125 ensures that the current level of the LEDs 130-140 does not exceed a certain current level for the range of voltage levels output by the rectified AC supply 120. Specifically, the resistance of the current limiting resistor 125 is selected to limit the amount of current flowing through the LEDs 130-140 to a certain current level for peak (or rated) rectified AC supply voltages. For example, the value of the current limiting resistor 125 may be selected such that the current flowing through the LEDs 130-140 does not exceed the current rating of the LEDs 130-140 at the maximum (or rated) output voltage of the rectified AC supply 120 (e.g., 187 $V_{peak}$). In such a case, the collector terminal of transistor A 112 may be electrically coupled to a first node of the current limiting resistor 125, and the emitter terminal of transistor A 112 may be electrically coupled to a second node of the current limiting resistor 125.

In one or more exemplary embodiments, transistor A 112, transistor B 108, the current sensing resistor 114, the current limiting resistor 125, and the biasing resistor 106 are part of a current limiting circuit and are configured to adjust the impedance through the LEDs 130-140 based on the voltage level of the rectified AC supply 120 and based on the level of current flowing through the LEDs 130-140. In particular, these components of the LED driver circuit 150 reduce the impedance through the LEDs 130-140 for lower LED currents (e.g., below a certain LED current threshold level). In cases where the optional current limiting resistor 125 is used, the current limiting resistor 125 may be bypassed or partially bypassed for these lower currents. As discussed in more detail below, this certain current threshold level is, in one exemplary embodiment, configured by adjusting the value of the current sensing resistor 114.

When transistor A 112 is turned on (i.e., current is flowing between the collector and emitter terminals of transistor A 112), current is sent through transistor A 112 to current sensing resistor 114. In cases where the current limiting resistor 125 is used, the current limiting resistor 125 is bypassed or partially bypassed by transistor A 112 to current sensing resistor 114. In other words, a significant portion (if not all) of the current flowing through the LEDs 130-140 flows through transistor A 112 to current sensing resistor 114 rather than through the current limiting resistor 125. In such a case, as the resistance of the collector to emitter junction of transistor A 112 is connected in parallel across the current limiting resistor 125, the total impedance through the LEDs 130-140 is reduced when transistor A 112 is turned on.

In one or more exemplary embodiments, when transistor A 112 is turned off, the current limiting resistor 125 may not be bypassed, causing the path through the LEDs 130-140 to include the total resistance of the current limiting resistor 125. As a result the total impedance through the LEDs 130-140 is higher when transistor A 112 is turned off than when transistor A 112 is turned on. In operation, transistor A 112 may be turned on for lower currents to reduce the impedance through the LEDs 130-140. Likewise, transistor A 112 may be turned off for higher currents to limit the amount of current flowing through the LEDs 130-140 to a suitable level. This adjustable impedance through the LEDs 130-140 results in increased efficiency and higher LED die utilization.

In one or more exemplary embodiments, transistor B 108 and the current sensing resistor 114 are used to selectively turn transistor A 112 on and off based on the level of current flowing through the LEDs 130-140. For example, the collector-emitter path of transistor B 108 may be disposed between the base of transistor A 112 and ground, as shown in FIG. 1A.

When the current flowing through the LEDs 130-140 is below a threshold current, the voltage level at node 190 (and thus, the voltage level at the base of transistor B 108) is not sufficient to turn on or fully turn on transistor B 108. When transistor B 108 is turned off, transistor A 112 is biased by the biasing resistor 106 and the rectified AC supply 120. Thus, for a range of LED currents from a small current level (as determined by the value of the biasing resistor 106) to a threshold current level, transistor A 112 is turned on to bypass or partially bypass the current limiting resistor 125.

In one or more exemplary embodiments, for LED current levels above the threshold level, the voltage level at the base of transistor B 108 may be sufficient to turn on transistor B 108. When transistor B 108 is turned on, transistor B 108 bypasses the biasing resistor 106 circuit to ground 110. This bypassing of the biasing resistor 106 circuit causes the voltage level at the base of transistor B 108 to decrease and in turn, cause transistor A 112 to turn off or partially turn off. When transistor A 112 is turned off or partially turned off, the current limiting resistor 125 is included in the path of LEDs 130-140 and increases the impedance through the LEDs 130-140. This increase in impedance limits the current through the LEDs 130-140.

Further, in one or more exemplary embodiments, transistor B 108 is used to reduce temperatures of the components of the LED lighting circuit 100 and avoid an overheating the LED lighting circuit 100. Specifically, exemplary transistor B 108 is configured so that the voltage across the base and emitter of transistor B 108 is reduced at increasing temperatures. For example, the base-emitter voltage of transistor B 108 is reduced by 7 millivolts for every one degree Celsius increase in temperature of transistor B 108. Because the base-emitter junction of transistor B 108 keeps the voltage across the current sensing resistor 114 substantially equal to the voltage across transistor B 108, the current flowing through the LEDs 130-140 is substantially constant. As the base-emitter voltage of transistor B 108 is slightly reduced with increasing temperatures, the current flowing through LEDs 130-140 is likewise slightly reduced. Such a feature with regard to reducing temperatures using transistor B 108 is useful in certain exemplary embodiments, such as when the LED lighting circuit 100 is used as part of a LED downlight, where the components inside the LED lighting circuit 100 are heavily insulated.

In summary, transistor A 112 is turned on to reduce the impedance through the LEDs 130-140 for lower rectified AC supply voltages (and thus, lower current levels through the LEDs 130-140) and turned off to increase the impedance through the LEDs 130-140 for higher rectified AC supply voltages (and thus, higher current levels through the LEDs 130-140). Therefore, the exemplary LED driver circuit 150 protects the LEDs 130-140 from high currents resulting from higher rectified AC supply voltages while also increasing the amount of electricity dissipated by the LEDs 130-140 for suitable current levels.

In certain exemplary embodiments, transistor A 112 is turned on when the current through the LEDs 130-140 is less than a threshold current. Similarly, exemplary transistor A 112 is turned off when the current through the LEDs 130-140 meets or exceeds the threshold current. In one exemplary embodiment, the threshold current is configured based upon the resistance of the current sensing resistor 114. For example, a higher resistance for the current sensing resistor 114 results in a higher voltage level at the base of transistor B 108 for lower currents through the LEDs 130-140. Thus, a higher resistance for the current sensing resistor 114 results in a lower threshold current. Likewise, a lower resistance for the current sensing resistor 114 results in a higher threshold current.

Since the current through the LEDs 130-140 is the same as through current sensing resistor 114, there may be a point where the voltage across current sensing resistor 114 exceeds 0.7 volts. In one or more exemplary embodiments, current sensing resistor 114 is sized so that the voltage across current sensing resistor 114 exceeds 0.7 volts at a desired current regulation point. When this voltage is reached (>0.7 volts), transistor B 108 will turn ON and reduce the current that biasing resistor 106 is injecting into the base of transistor A 112. As a result, the current through the LEDs 130-140 will stay substantially constant. In one or more exemplary embodiments, transistor A 112 and transistor B 108 each operates within its linear range while the circuit thereof regulates the current through the LEDs 130-140.

As discussed above, the current limiting resistor 125 may be excluded from the LED driver circuit 150 shown in FIG. 1A. In such exemplary embodiments, the collector-emitter path of transistor A 112 is connected in series with the LEDs 130-140. When transistor A 112 is partially turned off due to the current flowing through the LEDs 130-140 meeting or exceeding a threshold current, the path through the LEDs 130-140 becomes a high impedance circuit resulting in limited current flow through the LEDs 130-140. For rectified current levels flowing through the LEDs 130-140 that are below the threshold current level, transistor A 112 is turned on, allowing current to flow freely through the LEDs 130-140 and thus, illuminating the LEDs 130-140.

Other exemplary embodiments of the LED driver circuit 150 exist. For example, FIGS. 2 and 3 show exemplary variations of an LED driver circuit described above with respect to FIG. 1A. Embodiments are not limited to the exemplary configurations shown in FIGS. 2 and 3 and discussed herein. In the LED driver circuit 250 of the LED lighting circuit 200 of FIG. 2, the collector of transistor A 112 is connected within, rather than at the end of, the series-connected LEDs 130-140. Specifically, in this example, the collector of transistor A 112 is connected between LED 136 and LED 138.

In one or more exemplary embodiments, the collector of transistor A 112 may be connected at any other point (i.e., between any other two LEDs) along the series-connected LEDs 130-140. As a result, one or more LEDs (in this case, LED 138 and LED 140) are disposed in parallel with the collector-emitter path of transistor A 112 and in series with the current limiting resistor 125. In such a configuration, the LEDs 130-140 are illuminated when sufficient current flows through the LEDs 130-140 and the current limiting resistor 125, rather than through the collector-emitter path of transistor 130-140. That is, the LEDs 130-140 are illuminated when transistor A 112 has high voltage between its collector and emitter.

During operation, transistor A 112 is selectively turned on and off by transistor B 108 based, in part, on the amount of current flowing through the LEDs 130-140, similar to the operation of the LED driver 150 of FIG. 1A. In this exemplary embodiment, when transistor B 108 is turned on (i.e., the level of current flowing through the LEDs 130-140 meets or exceeds the threshold current level), transistor B 108 bypasses or partially bypasses the LEDs 130-140 and the current limiting resistor 125. Thus, when transistor B 108 is turned on, the LEDs 130-140 do not receive sufficient current to provide illumination. When transistor B 108 is turned off or partially off, current flows through the LEDs 130-140 and the current limiting resistor 125, illuminating the LEDs 130-140.

Exemplary embodiments of a LED driver as described above with respect to FIG. 2 may provide increased efficiency. For example, for high rectified AC supply voltage levels (causing the LED current level to meet or exceed the threshold current level), a portion of the power fed to the LED driver 250 is dissipated by the additional LEDs (in FIG. 2, LED 138 and LED 140) rather than solely by the current limiting resistor 125. As a result, the light output of the LEDs 130-140 is increased, leading to greater efficiency. In one exemplary implementation of the LED driver circuit 250, test results showed an efficiency gain of 5.5% over the LED driver circuit 125 of FIG. 1A at a 120 $V_{rms}$ AC source input voltage, and an efficiency gain of 8.1% at 132 $V_{rms}$ AC source input voltage. The efficiency of the LED driver 250 may also exceed the typical efficiency of substantially more expensive conventional switching mode LED drivers.

In FIG. 3, the exemplary LED driver circuit 350 of the LED lighting circuit 300 includes a multitude of parallel transistors (i.e., transistor C 360, transistor D 364, and transistor E 368) in place of transistor A 112 from FIG. 1A. The exemplary LED driver circuit 350 also includes a current balancing resistor (i.e., current balancing resistor A 362, current balancing resistor B 366, and current balancing resistor C 370) electrically coupled between the emitter of each of the parallel transistors (i.e., transistor C 360, transistor D 364, and transistor E 368) and the base of transistor B 108. The current balancing resistors (i.e., current balancing resistor A 362, current balancing resistor B 366, and current balancing resistor C 370) are used to ensure that the amount of current flowing through the parallel transistors (i.e., transistor C 360, transistor D 364, and transistor E 368), when the parallel transistors (i.e., transistor C 360, transistor D 364, and transistor E 368) are turned on, is similar.

In one or more exemplary embodiments, the arrangement of the parallel transistors (i.e., transistor C 360, transistor D 364, and transistor E 368) enables the use of lower power transistors to meet the power criteria of the LED lighting circuit 300 rather than a single, higher power transistor (e.g., transistor A 112 from FIG. 1A). The use of multiple lower power transistors (e.g., transistor C 360, transistor D 364, and transistor E 368) rather than a single, higher power transistor provides a decreased component expense for the LED driver circuit 350. This arrangement of parallel transistors (e.g., transistor C 360, transistor D 364, and transistor E 368) also provides improved thermal performance over configurations using a single, higher power transistor.

Although the exemplary LED driver circuits described above have been illustrated as having bipolar transistors, other types of transistors may also be used in place of the bipolar transistors. In exemplary embodiments, one or more of the bipolar transistors of each LED driver circuit described above with respect to FIGS. 1A, 2, and 3 may be replaced with a field-effect transistor ("FET"), a junction gate FET ("JFET"), a metal oxide semiconductor FET ("MOSFET"), some other suitable type of transistor, or any combination thereof. For example, FIGS. 4A and 4B each show an exemplary LED driver circuit using a MOSFET and other complementary devices in place of transistor A 112 of FIG. 1A.

FIG. 4A shows a LED lighting circuit 400 having a LED driver circuit 450 in accordance with one or more exemplary embodiments. Referring now to FIG. 4A, the exemplary LED driver circuit 450 includes a MOSFET 412 in place of the bipolar transistor (i.e., transistor A 112) of FIG. 1A. The LED driver circuit 450 also includes a zener diode 480 electrically coupled between the gate of the MOSFET 412 (and so also the collector of transistor B 108) and ground 110. In one or more exemplary embodiments, the zener diode 480 protects the MOSFET 412 by clamping the voltage level at the MOSFET's gate. The LED driver circuit 450 operates substantially similar to the LED driver circuit 150 of FIG. 1A. In another embodiment, although not illustrated, transistor B 108, a bipolar transistor, is replaced with a MOSFET.

FIG. 4B shows a LED driver circuit 450 in accordance with one or more exemplary embodiments. Now referring to FIG. 4B, the exemplary LED driver circuit 450 is slightly varied from the configuration described above in FIG. 4A. Specifically, the zener diode 480 in FIG. 4B is electrically coupled between the gate of the MOSFET 412 and the base of transistor B 108. In one or more exemplary embodiments, the zener diode 480 in FIG. 4B protects the MOSFET 412 by clamping the voltage level at the MOSFET's gate. The LED driver circuit 450 operates substantially similar to the LED driver circuit 150 of FIG. 1 described above. In addition, in an alternative embodiment, although not illustrated, transistor B 108 is replaced with a MOSFET.

FIG. 5 presents a LED lighting circuit 500 having two or more parallel LED paths (in this example, array of LEDs 530-536 and array of LEDs 538-544), each having one or more LEDs connected in series in accordance with one or more exemplary embodiments. Embodiments are not limited to the exemplary configuration shown in FIG. 5 and discussed herein. Referring to FIG. 5, the exemplary LED driver 550 includes a transistor (in this example, transistor C 560 and transistor D 566) for each of the LED paths (LEDs 530-536 and LEDs 538-544). Specifically, the LED driver 550 includes transistor C 560 for LEDs 530-536 and transistor D 566 for LEDs 538-544. In certain exemplary embodiments, the LED paths are current balanced.

In one or more exemplary embodiments, the LED driver circuit 550 also includes a current limiting resistor (in this example, current limiting resistor C 564 and current limiting resistor D 570) connected between the collector-emitter path of each of transistor C 560 and transistor D 566, respectively. These current limiting resistors (current limiting resistor C 564 and current limiting resistor D 570) function similarly to the current limiting resistor 125 described above in FIG. 1A. In other words, current limiting resistor C 564 and current limiting resistor 570 limit the current flowing through LEDs 530-536 and LEDs 538-544, respectively, when the LED current is high. In addition, transistor C 560 and transistor D 566 function similarly to transistor A 112 of FIG. 1A. When transistor C 560 and transistor D 566 are turned on, transistor C 560 and transistor D 566 bypass or partially bypass their respective current limiting resistor (current limiting resistor C 564 and current limiting resistor D 570, respectively). When transistor C 560 and transistor D 566 are turned off, substantially all of the current flowing through the respective LEDs (LEDs 530-536 and LEDs 538-544) flows through the respective current limiting resistor (current limiting resistor C 564 and current limiting resistor D 570, respectively).

In one or more exemplary embodiments, transistor B 108 selectively turns transistor C 560 and transistor D 566 on and off based on the current flowing through LEDs 530-536 and LEDs 538-544. When the voltage level at node 590 meets or exceeds a threshold voltage level, transistor B 108 turns on causing transistor C 560 and transistor D 566 to turn off or partially turn off. That is, for LED current that meets or exceeds the threshold LED current level, transistor C 560 and transistor D 566 turn off or partially turn off, while current limiting resistor C 564 and current limiting resistor D 570 are used to increase the impedance through LEDs 530-536 and LEDs 538-544, respectively, and therefore, regulate the level of current flowing through LEDs 530-536 and LEDs 538-544, respectively. Likewise, when the voltage level at node 590 is less than the threshold voltage level, transistor B 108 turns off causing transistor C 560 and transistor D 566 to turn on and bypass or partially bypass the respective current sensing resistors (current limiting resistor C 564 and current limiting resistor D 570).

Thus, in one or more exemplary embodiments, transistor B 108 controls transistor C 560 and transistor D 566 to regulate the amount of current flowing through LEDs 530-536 and LEDs 538-544. Total current through LEDs 530-536 and LEDs 538-544 is controlled by the current sensing resistor 114. In certain exemplary embodiments, current balancing resistors (in this example, current balancing resistor C 562 and current balancing resistor D 568) are used to balance the current through LEDs 530-536 and LEDs 538-544.

The LED driver circuit 550 allows several paths of LEDs (in this example, LEDs 530-536 and LEDs 538-544) to be illuminated in the LED lighting circuit 500 to get more lumen output or more evenly distributed light output. Specifically, the use of parallel LED paths (e.g., LEDs 530-536 and LEDs 538-544) enables the use of lower power LED paths rather than a single higher power LED path. In addition, this arrangement of LEDs 530-544 provides improved thermal performance over a single higher power LED path, as described above with respect to FIG. 1A. Specifically, because parallel LED paths use less power, less heat from losses is generated, thus improving the thermal performance compared to a single LED path.

Although not illustrated, in an alternative exemplary embodiment, one or more additional LEDs are disposed in parallel with the collector-emitter path of each of transistor C 560 and transistor D 566 rather than (or in addition to) using current limiting resistor C 564 and current limiting resistor D 570, similar to LED driver 250 discussed above with respect to FIG. 2. In addition (or in the alternative), current limiting resistor C 564 and current limiting resistor D 570 may be excluded in certain alternative embodiments. Also, multiple transistors in parallel may replace one or more of transistor C 560 and transistor D 566, similar to the LED driver circuit 350 described above with respect to FIG. 3.

Figure 6A:
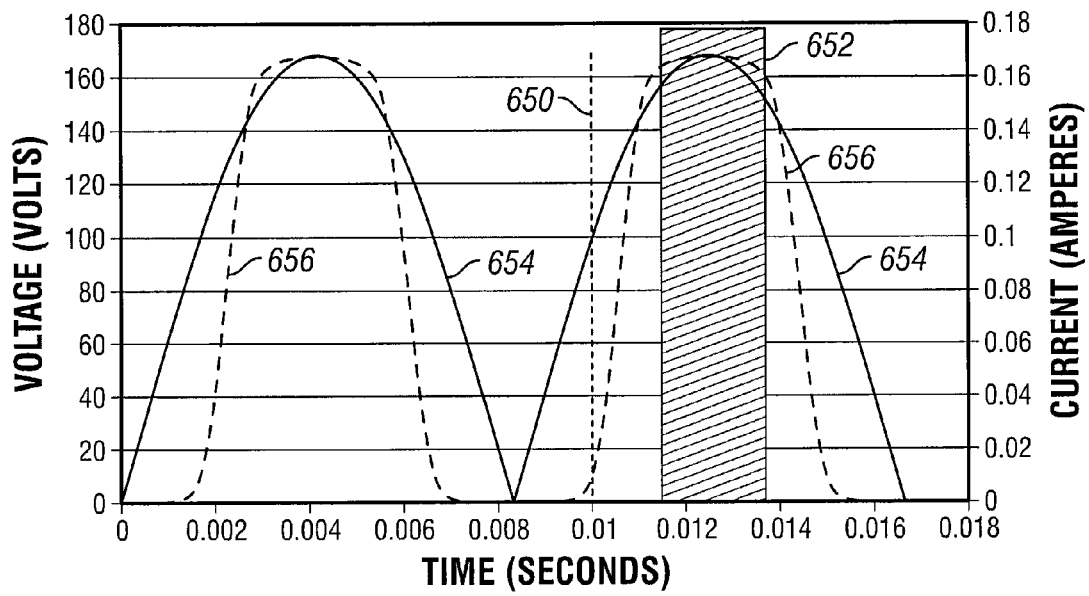
FIG. 6A shows a graph of voltage and current of the single array of LEDs shown in FIG. 1A operating at full line voltage.

FIG. 6A shows a graph of voltage and current of the series-connected LEDs 130-140 shown in FIG. 1A operating at full line voltage. Now referring to FIGS. 1 and 6, Voltage is represented by line 654 and current is represented by line 656. Line 650 indicates the voltage where the LEDs 130-140 are just barely ON. For example, this may be about 100V. The shaded area 652 indicates the region of the sine wave where the alternating current through the LEDs 130-140 is being regulated by the circuit of transistor A 112 and transistor B 108 operating in their respective linear region. Outside of the shaded area, transistor A 112 is hard on, and transistor B 108 is off. As FIG. 6A shows, the current waveform is distorted and does not look much like a sinusoid. In this particular case the total-harmonic-distortion (THD) is about 40%. This is because the current is zero when the voltage is lower than about 100V (i.e., the LEDs are off).

Figure 6B:
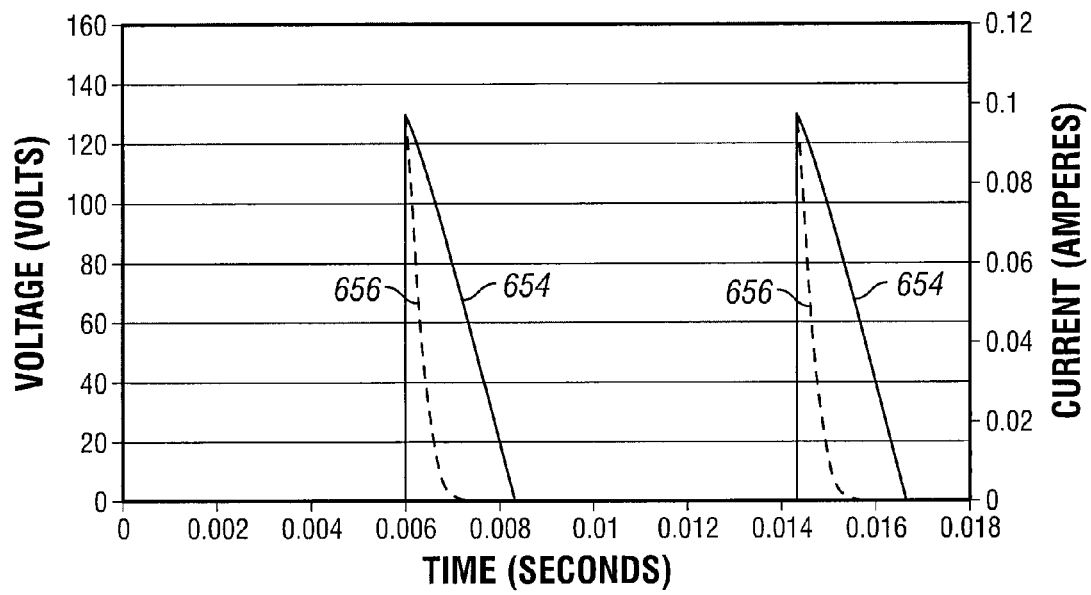
FIG. 6B shows a graph of voltage and current of the single array of LEDs shown in FIG. 1A operating at reduced line voltage from a light dimmer.

FIG. 6B shows a graph of voltage and current of the single array of LEDs shown in FIG. 1A operating at reduced line voltage from a light dimmer. Referring now to FIGS. 1, 6A, and 6B, the graph shows the same voltage (654) and current (656) waveforms as those in FIG. 6A, but the voltage is reduced by a light dimmer (not shown). As shown, the dimmer conducts for about 2 milliseconds or about 45 degrees of a 60 Hertz sine wave. In this situation the current regulation circuit may not have time to regulate the current through the LEDs 130-140. Because the LEDs 130-140 turn on and off very quickly (no thermal lag time like with an incandescent light), any minor fluctuations in line voltage or dimmer firing angle may be apparent in the form of light flicker. In one or more exemplary embodiments, this light flicker gets worse as the firing angle is increased, because the energy delivered to the LEDs 130-140 drops significantly. At a low enough duty rate, the average power delivered to the LEDs 130-140 is comparable to the fluctuation of power as a result of dimmer or line voltage fluctuation. At this point, determination of light flicker may be subjective because people perceive flicker differently. However, if the LEDs 130-140 operate on a dimmer that can be set to a firing angle high enough, there will be a point where flicker will be apparent from the circuit presented in FIG. 1A.

Figure 7A:
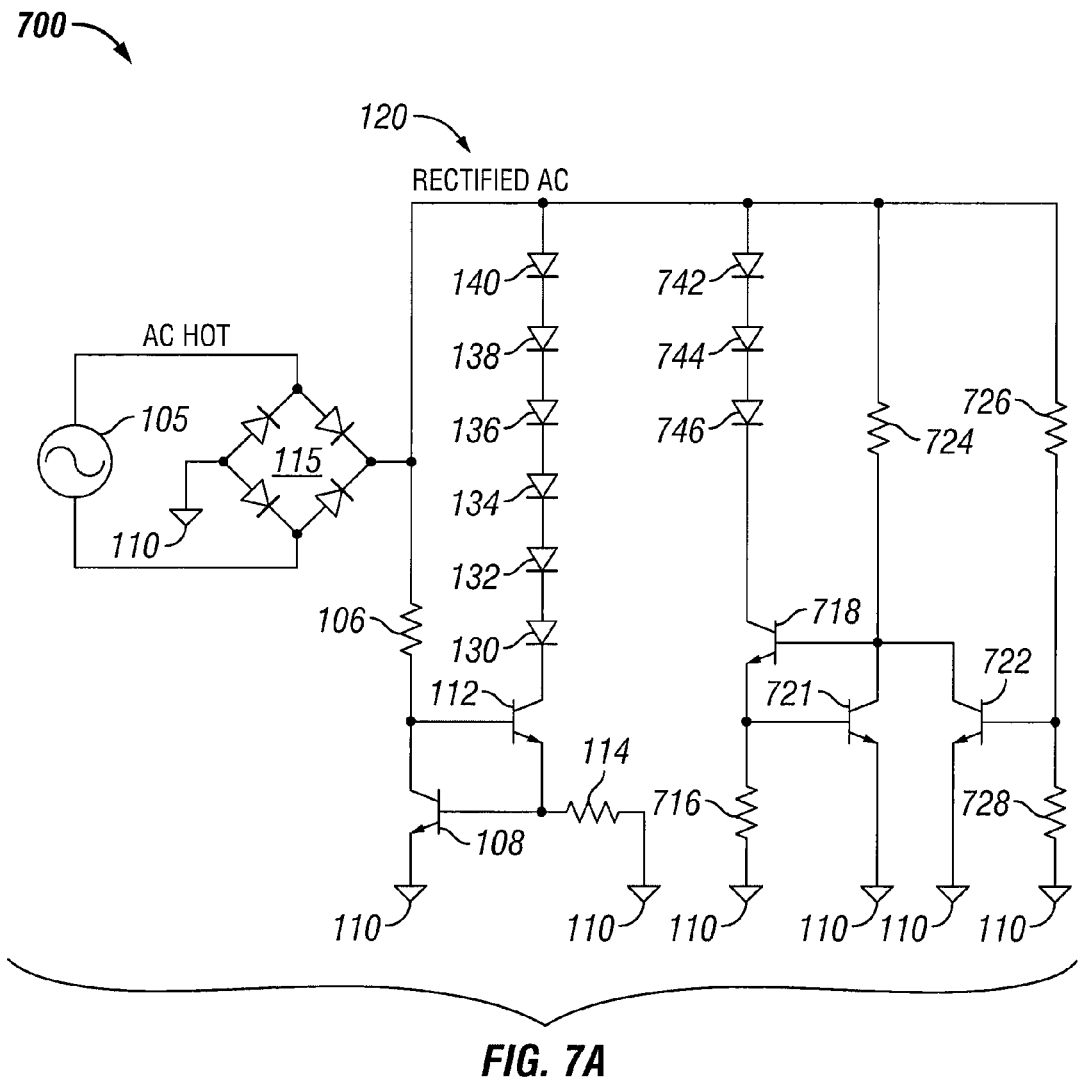
FIG. 7A shows a schematic diagram of a LED lighting circuit that includes two arrays of current regulated LEDs having in accordance with one or more exemplary embodiments.

FIG. 7A shows a schematic diagram of a LED lighting circuit 700 according to one or more exemplary embodiments. Embodiments are not limited to the exemplary configuration shown in FIG. 7A and discussed herein. Now referring to FIG. 7A, the exemplary circuit 700 includes two arrays of series-connected current-regulated LEDs (LEDs 130-140 and LEDs 742-746) having flicker reduction. The first array of LEDs 130-140 is substantially the same as LEDs 130-140 described above with respect to FIG. 1A. The second array of LEDs 742-746 is in parallel with LEDs 130-140 and is fed by the same rectified AC 120. In one or more exemplary embodiments, the first array of LEDs 130-140 is coupled to and controlled by a current limiting circuit, and the second array of LEDs 742-746 is coupled to and controlled by a different current limiting circuit. As a result of the current limiting circuits controlling each of the LED arrays the circuit 700 improves flicker and THD. The number of LEDs 742-746 (three shown) on the second array and the current through LEDs 742-746 jointly determine the THD, flicker immunity, and minimum dimming level capabilities of the LED lighting circuit 700. In one or more exemplary embodiments, a greater number of LEDs in the second array of LEDs 742-746 results in a higher current to flow therethrough and increase the minimum light level.

When the voltage across the second array of the LEDs 742-746 exceeds the sum of the forward voltages of LEDs 742-746, LEDs 742-746 will conduct current (turn on). As the voltage increases, the current through LEDs 742-746 also increases. Because the current through LEDs 742-746 is the same as the current through resistor 716, there is a point where the voltage across resistor 716 exceeds 0.7 volts (or some other voltage that may trigger transistor C 721). In one or more exemplary embodiments, resistor 716 is sized so the voltage across resistor 716 exceeds 0.7 volts at a desired current regulation point.

In one or more exemplary embodiments, when this voltage across resistor 716 is reached (>0.7 volts) transistor C 721 turns ON and reduces the current that resistor 724 injects into the base of transistor D 718. As a result, the current through LEDs 742-746 remains substantially constant. Transistor C 721 and transistor D 718 operate in their respective linear ranges while the circuit thereof is regulating the current through LEDs 742-746. In one or more exemplary embodiments, transistor E 722 is configured to shut off transistor C 718, thus blocking current from flowing through LEDs 142-146 when the rectified AC voltage 120 generated by the full wave bridge rectifier 115 is above a certain voltage value that is greater than the turn-on voltage of the first array of LEDs 130-140. In one or more exemplary embodiments, the second array of LEDs 142-146 includes of one or more LEDs.

The table below shows, in generic terms, how different variations to the second array of LEDs 142-146 of the LED lighting circuit 700 may affect system performance. There may be other factors (e.g., total system power consumption, total light output at full line voltage and system efficacy), related more to the first array of LEDs 130-140, that may be adjusted.

|  | THD | Min light level | Flicker | System Efficiency |
|---|---|---|---|---|
| Increase second array voltage (add more LEDs to LEDs 142-146) | Depends on main branch current level and the set point of secondary current | Increases | Increases | Increases |
| Increase current flowing through second array of LEDs 142-146 | Depends on main branch current level | Increases | Decreases | Decreases |
| Increase line cutoff voltage (point where second array of LEDs 142-146 turns off) | Decreases (until cutoff voltage = main branch turn on voltage) | Increases | Decreases | Decreases |

Figure 7B:
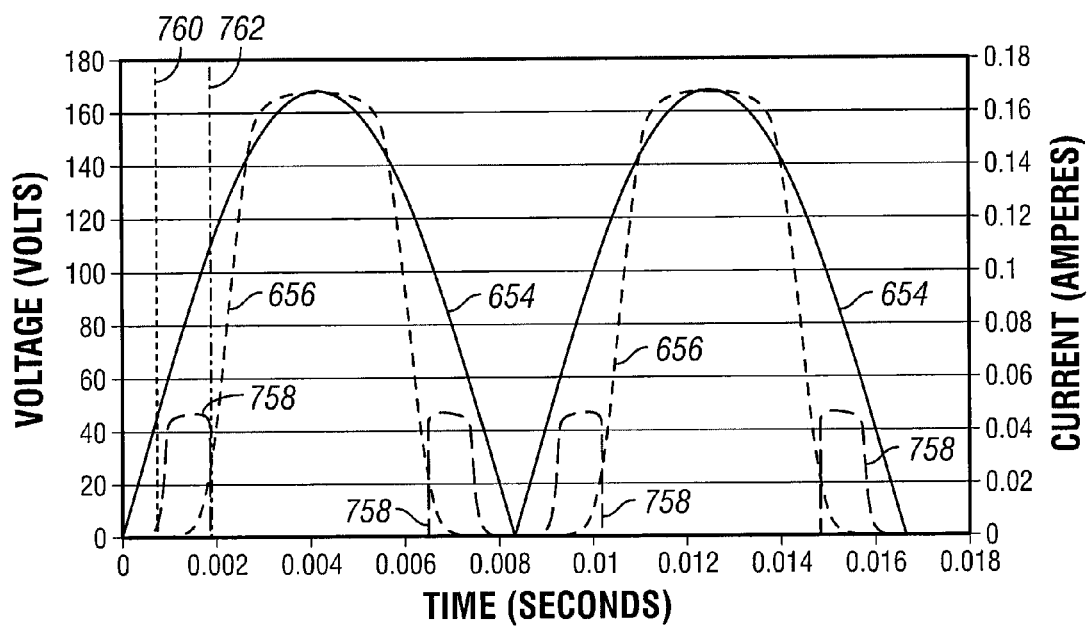
FIG. 7B shows a graph of voltage and current of the two arrays of LEDs shown in FIG. 7A operating at full line voltage in accordance with one or more exemplary embodiments.

FIG. 7B displays a graph of voltage and current for the two arrays of LEDs (i.e., LEDs 130-140 and LEDs 742-746) shown in FIG. 7A operating at full line voltage. Referring to FIGS. 7A-B, the current 656 and voltage 654 for the first array of LEDs 130-140 is substantially similar to the current and voltage shown in the graph of FIG. 6B with respect to LEDs 130-140 of FIG. 6A. The current 758 for the second array of LEDs 742-746 is also shown. Line 760 denotes the point at which the second array of LEDs 742-746 turns on (about 40V). The voltage at which the second array of LEDs 742-746 turns on may be on the number of LEDs that are in the second array of LEDs 742-746. In one or more exemplary embodiments, more than three or less than three series connected LEDs may be used for the second array of LEDs 742-746. Line 762 denotes the voltage at which the second array of LEDs 742-746 turns OFF and the first array of LEDs 130-140 turns on (about 100V). The voltage denoted by line 762 may be selected so there is some overlap between when the first array LEDs 130-140 turns on and the second array of LEDs 742-746 turns off. The voltage denoted by line 762 may be independently set by selection of resistance values for resistors 726 and 728.

Figure 8A:
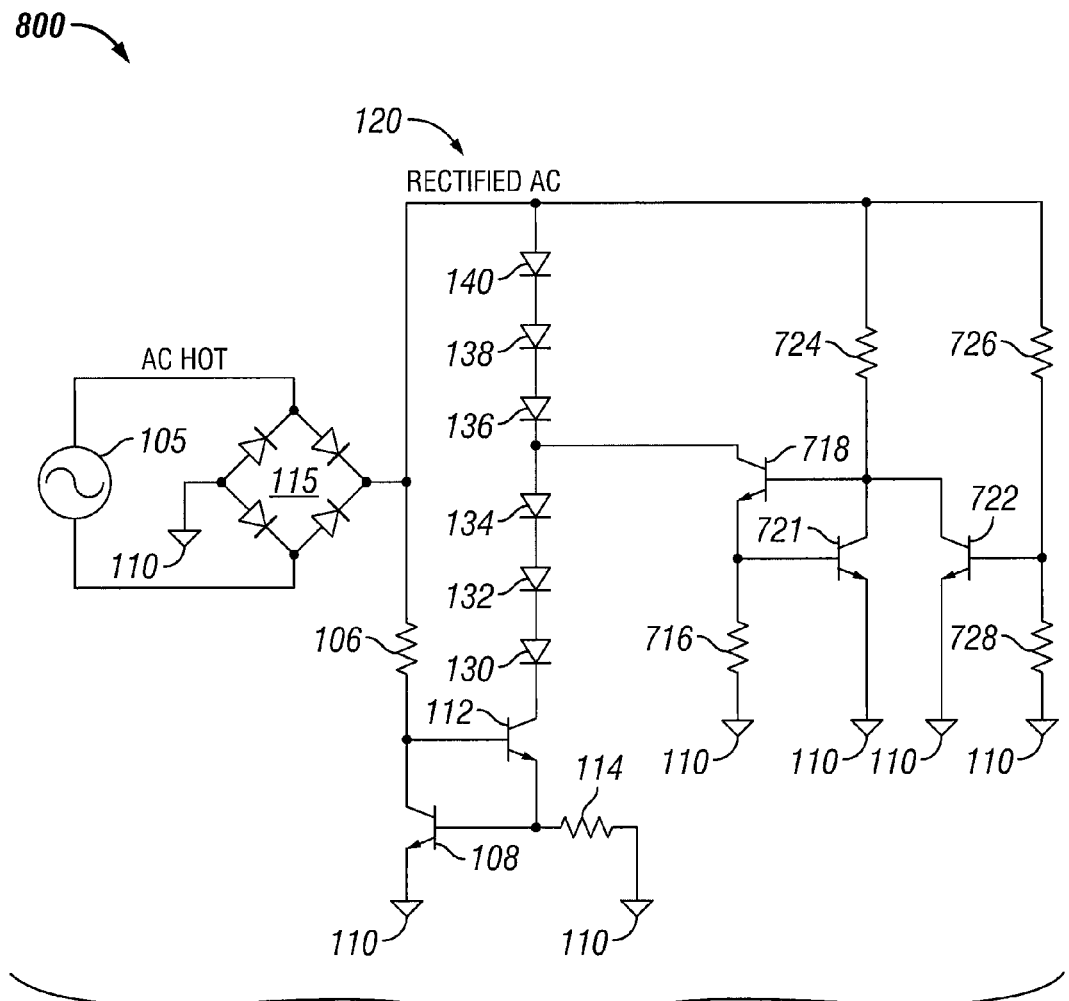
FIG. 8A shows a schematic diagram of a LED lighting circuit that includes a pseudo second array of current regulated LEDs in accordance with one or more exemplary embodiments.

FIG. 8A shows a schematic diagram of a LED lighting circuit 800 in accordance with one or more exemplary embodiments. Embodiments are not limited to the exemplary configuration shown in FIG. 8A and discussed herein. Now referring to FIG. 8A, the LED lighting circuit 800 differs from the LED lighting circuit 700 of FIG. 7A in that the LED lighting circuit 800 includes a dual function single array of current regulated LEDs 130-140, as opposed to the two arrays of current regulated LEDs (LEDs 130-140 and LEDs 742-746) in FIG. 7A. Further, the collector of transistor C 718 is connected between two LEDs in the single array of LEDs 130-140 (in this example, between LED 136 and LED 138). In one or more exemplary embodiments, the collector of transistor C 718 is connected at any other point (i.e., between any other two LEDs) along the series-connected LEDs 130-140. As a result, one or more LEDs (in this case, LEDs 130-134) are disposed in parallel with the collector-emitter path of transistor C 718. As long as average power of LEDs 130-140 does not exceed LED device specification, LEDs 136-140 are utilized to create a pseudo second array of LEDs 136-140, used at the lower voltage, with comparable performance and advantages as those of the LED lighting circuit 700, but without the necessity of additional LEDs in the form of an actual second array of LEDs.

Figure 8B:
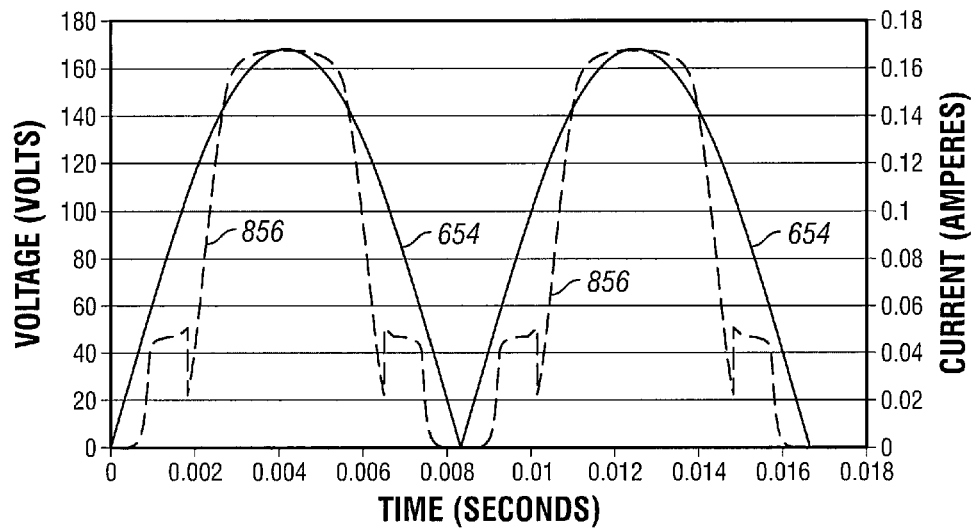
FIGS. 8B and 8C each show a graph of voltage and current of a LED lighting circuit that includes the pseudo second array of current regulated LEDs shown in FIG. 8A operating at full line voltage in accordance with one or more exemplary embodiments.

FIG. 8B provides a graph of voltage and current of the dual function single array of LEDs of FIG. 8A operating at full line voltage. Referring to FIGS. 8A-B, the current 856 is depicted through the series connected LEDs 130-140 over a full sine wave. The current 856 at each point in time is substantially similar to the sum of current 656 and current 758 shown in FIG. 7B through the first array of LEDs 130-140 and the second array of LEDs 142-146 shown in FIG. 7A. In addition, the current 856 fills a portion of the area near zero voltage crossing. For this reason, the LED lighting circuit 800 has a lower THD (by approximately 16 percent, for example) compared to the LED lighting circuit 700 of FIG. 7A. In addition, the configuration of the LED lighting circuit 800 also minimizes the power wasted through transistor C 718 while providing very good flicker immunity when used with a light dimmer.

Figure 8C:
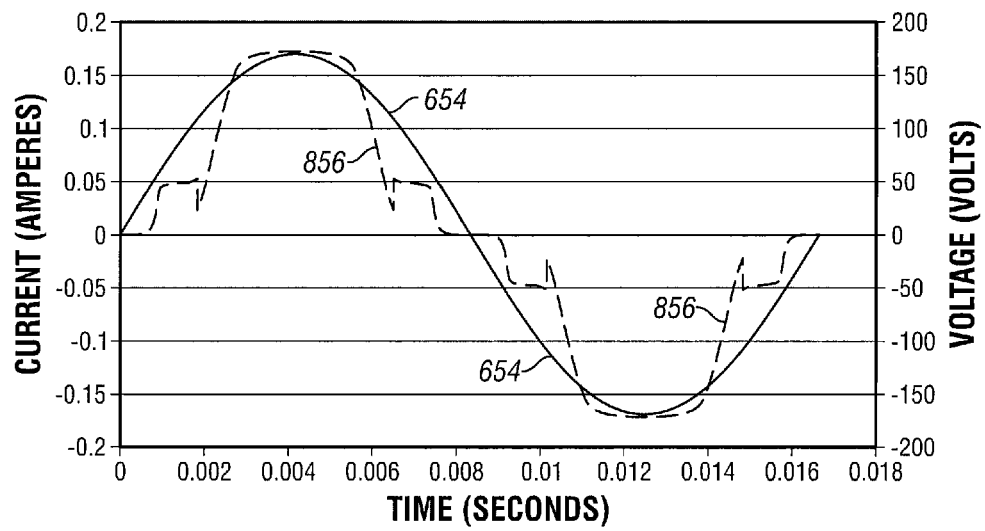

FIG. 8C shows a graph of the voltage 654 and current 856 of a single operating cycle of the LEDs of the LED lighting circuit 800 of FIG. 8A. Now referring to FIGS. 8A-C, the voltage 654 and current 856 waveforms shown are representative on the line side of the full wave bridge rectifier 115. Graphically, the current waveform 856 is not sinusoidal; however, mathematically speaking, the current waveform 856 is closer to a sinusoid than the current waveform 656 of FIG. 6A. As a result, the THD of the LED lighting circuits shown in FIGS. 7A and 8A are lower than the THD in the LED lighting circuit 100 of FIG. 1A.

Figure 9A:
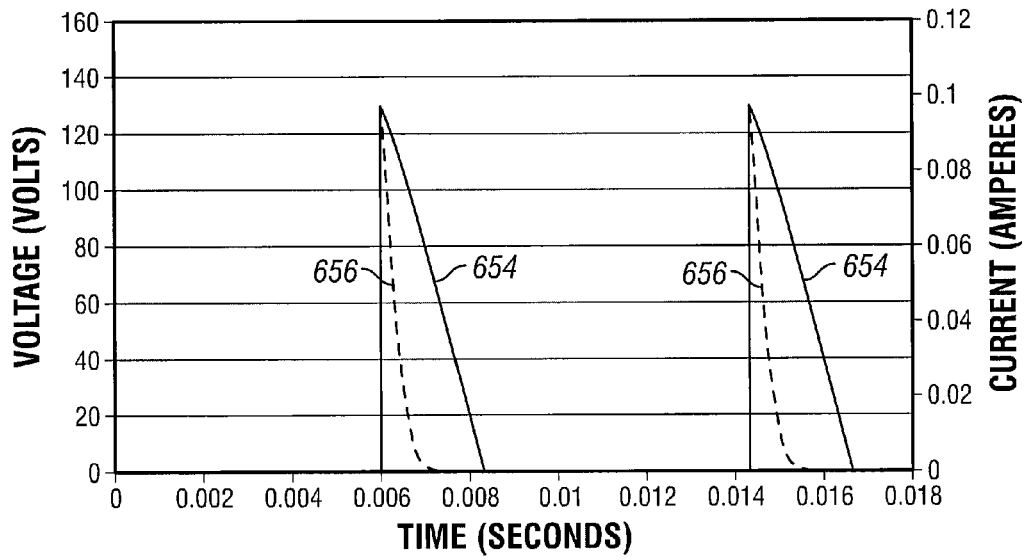
FIGS. 9A and 9B show comparative graphs of voltage and current for different LED lighting circuits in accordance with one or more exemplary embodiments.
Figure 9B:
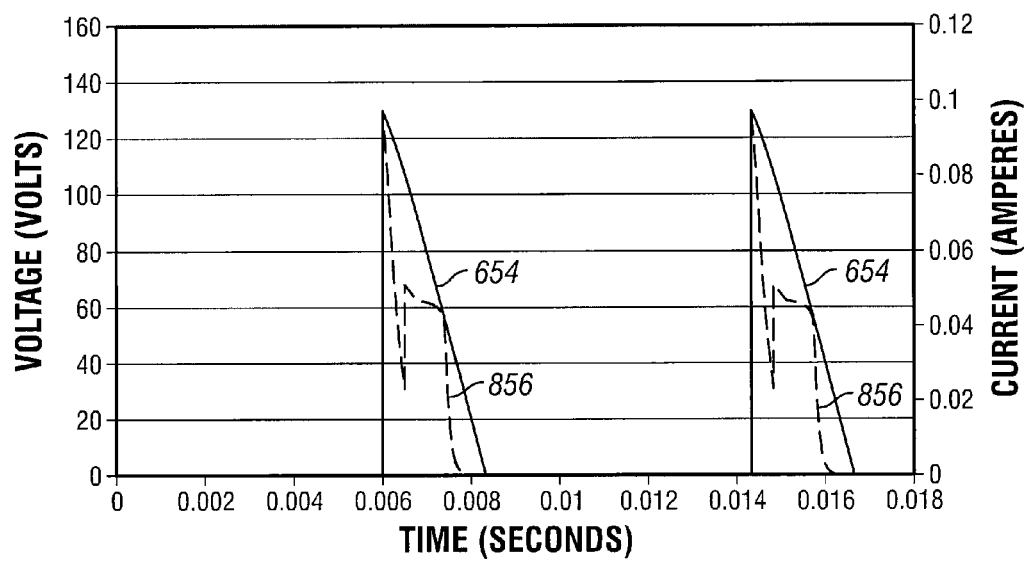

FIGS. 9A and 9B each show a graph of voltage and current of the single array of LEDs operating at reduced line voltage from a light dimmer. Referring to FIGS. 9A-B, the graphs show the total system current with respect to voltage. In FIG. 9A, the voltage 654 and the current 656 are substantially the same as the voltage/current shown in the graph of FIG. 6B, which describes the single array of LEDs in the circuit 100 of FIG. 1A. FIG. 9B shows the voltage 654 and the current 856 for the LED lighting circuit 800 of FIG. 8A. In comparing the current 856 with the current 656, the pseudo second array of LEDs (LEDs 136-140 in FIG. 8A) draws extra current during the decrease in voltage 654 compared to the LED lighting circuit 100 of FIG. 1A. This additional current 856 in FIG. 9B may add to the minimum dimming level. Further, the additional current 856 may also make the minute fluctuations due to dimmers and/or line voltage insignificant to the human eye.

Figure 10:
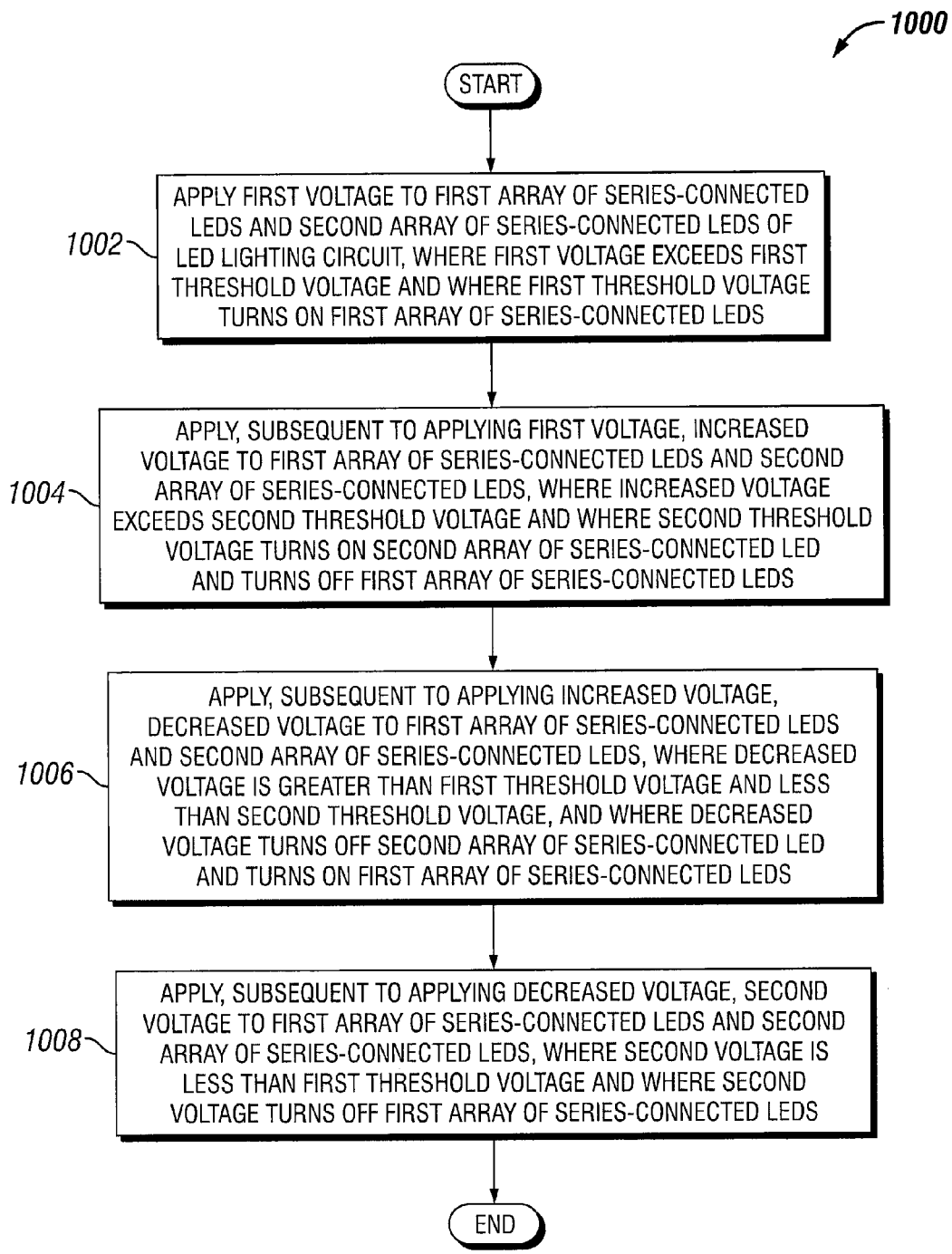
FIG. 10 shows a flowchart of a method for controlling a LED lighting circuit in accordance with one or more exemplary embodiments.

FIG. 10 is a flowchart of a method 1000 for controlling a LED lighting circuit in accordance with one or more exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments, one or more of the steps described below may be omitted, repeated, and/or performed in a different order. In addition, a person of ordinary skill in the art will appreciate that additional steps not shown in FIG. 10, may be included in performing this method. Accordingly, the specific arrangement of steps should not be construed as limiting the scope.

Now referring to FIG. 10, the exemplary method 1000 begins at step 1002, where a first voltage is applied to a first array of series-connected LEDs and a second array of series-connected LEDs of the LED lighting circuit. In one or more exemplary embodiments, the first and second array of series-connected LEDs are connected in parallel, joined at a common node where the first voltage is applied. In certain exemplary embodiments, the first voltage exceeds a first threshold voltage, whereby the first threshold voltage turns on the first array of series-connected LEDs. In other words, the first threshold voltage is the turn-on voltage for the first array of the series-connected LEDs in certain exemplary embodiments.

In step 1004, subsequent to applying the first voltage, an increased voltage is applied to the first array of series-connected LEDs and the second array of series-connected LEDs. For example, the increased voltage is applied to the same node to which the first voltage is applied. In this exemplary embodiment, the increased voltage exceeds a second threshold voltage, whereby the second threshold voltage turns on the second array of series-connected LED and turns off the first array of series-connected LEDs.

In step 1006, subsequent to applying the increased voltage, a decreased voltage is applied to the first array of series-connected LEDs and the second array of series-connected LEDs. The decreased voltage is applied to the same node to which the first voltage is applied. In one or more exemplary embodiments, the decreased voltage is greater than the first threshold voltage and less than the second threshold voltage, whereby the decreased voltage turns off the second array of series-connected LED and turns on the first array of series-connected LEDs.

In step 1008, subsequent to applying the decreased voltage, a second voltage is applied to the first array of series-connected LEDs and the second array of series-connected LEDs. The second voltage is applied to the same node to which the first voltage is applied. In one or more exemplary embodiments, the second voltage is less than the first threshold voltage and turns off the first array of series-connected LEDs.

In one or more exemplary embodiments, the first voltage, the increased voltage, the decreased voltage, and the second voltage are voltages along a positive half of a sinusoidal wave representing a half of a cycle of AC voltage. Further, the LED lighting circuit and/or the LEDs within the LED lighting circuit may be dimmable in one or more exemplary embodiments.

In one or more exemplary embodiments, the first threshold voltage of the first array of series-connected LEDs and/or the second threshold voltage of the second array of series-connected LEDs is set and/or adjusted to conform to one or more operating parameters. Such operating parameters include, but are not limited to, maintaining a high dimming range, reducing flicker effects, improving THD, and reducing power consumption.

For example, the first threshold voltage is set and/or adjusted using a first transistor that includes a collector-emitter path coupled in series with the first array of series-connected LEDs. In such a case, the first transistor is activated and deactivated using a second transistor electrically coupled to the first transistor. Likewise, the second threshold voltage is controlled in a separate circuit using a third transistor that includes a collector-emitter path coupled in series with the second array of series-connected LEDs. In such a case, the third transistor is activated and deactivated using a fourth transistor electrically coupled to the third transistor. The first threshold voltage and/or the second threshold voltage may also be set and/or adjusted using one or more other components (e.g., resistor, diode) in conjunction with, or instead of, the transistors described above.

As another example, to lower the THD, the forward voltage and the forward current of the second array of series-connected LEDs is approximately half the forward voltage and the forward current of the first array of series-connected LEDs. As another example, to lower the power and increase the efficacy, the current flowing through the second array of series-connected LEDs is minimized (decreased). Alternatively, the second array of series-connected LEDs may be removed. In such an example, the solution is independent of the forward voltage of the second array of series-connected LEDs.

As another example, to decrease the flicker, the forward voltage of the second array of series-connected LEDs is minimized (decreased) while the current flowing through the second array of series-connected LEDs is maximized (increased). As another example, to increase the dimming range, the forward voltage and the forward current of the second array of series-connected LEDs is minimized (decreased).

The following description (in conjunction with FIGS. 1 through 10) describes an example in accordance with one or more exemplary embodiments. The example is for explanatory purposes only and is not intended to limit the scope. Terminology used in FIGS. 1-10 may be used in the example without further reference to those figures.

EXAMPLE

Consider the following example, using the LED lighting circuit 800 described above. In this example, the following table shows a value for each of the various components shown in the LED lighting circuit 800, particularly in the current limiting circuit. The transistors used in this example are bipolar transistors. Further, the graph described in FIG. 8B above shows the current 856 and voltage 854 for a cycle of AC power. In this example, the AC power source 105 delivers 120 VAC power to the full bridge rectifier 115. The full bridge rectifier 115 converts the 120 VAC into positive voltages with a peak of 167 V.

| Component | Value |
| --- | --- |
| Resistor 106 | >100 kOhm (The actual value depends on, at least, the beta value of transistor A 112) |
| Resistor 114 | Depends on desired current ($R_{114} = V_{be}$ of transistor A $112/I_{set}$ for LEDs 130-140) |
| Resistor 716 | Depends on desired current ($R_{716} = V_{be}$ of transistor D $718/I_{set}$ for LEDs 742-746) |
| Resistor 724 | >100 kOhm (The actual value depends on, at least, the beta value of transistor D 718) |
| Resistor 726 | $R_{728} + R_{726} = 0.7 V * R_{728} * R_{726}/V_f$ of LEDs 130-140 |
| Resistor 728 | Pick this in the 1 kOhm-2 kOhm range and solve equation above for Resistor 726 | where $V_{be}$ is the base-emitter voltage of the specified transistor, $I_{set}$ is load current flowing through the specified LEDs, and $V_f$ is the forward voltage of the specified LEDs.

As the cycle begins, the rectified voltage starts at zero and ramps upward. When the rectified voltage reaches approximately 40 V, current flows through the pseudo array of series-connected LEDs 136-140 and the current limiting circuit (including resistors 716, 724, 726, and 728 and transistors 718, 721, and 722) shown on the right of FIG. 8A. As the rectified voltage increases toward about 100 V, the aforementioned current limiting circuit for LEDs 136-140 maintains the current through LEDs 136-140 at a relatively constant rate of 0.045 A.

When the rectified voltage reaches approximately 100 V, the current limiting circuit for LEDs 136-140 turns off LEDs 136-140, dropping the current through LEDs 136-140 toward zero. At substantially the same time, a different current limiting circuit (including resistors 106 and 114 and transistors 108 and 112), shown in the middle of FIG. 8A, activates the array of series-connected LEDs 130-140. As a result, LEDs 130-140 turn on and the current flowing through LEDs 130-140 increases. As the rectified voltage approaches 150 V, the current limiting circuit for LEDs 130-140 limits the current flowing through LEDs 130-140 at approximately 0.167 A. The current flowing through LEDs 130-140 remains at approximately 0.167 A as the rectified voltage peaks at 167 V until the rectified voltage declines back to approximately 150 V.

As the rectified voltage decreases to approximately 100 V, the current limiting circuit for LEDs 130-140 turns off LEDs 130-140, dropping the current through LEDs 130-140 toward zero. At substantially the same time, the current limiting circuit for LEDs 136-140 again activates the array of series-connected LEDs 136-140. As a result, LEDs 136-140 turn on, and the current flowing through LEDs 136-140 increases. When the rectified voltage declines to approximately 40 V, the current limiting circuit for LEDs 136-140 turns off LEDs 136-140. The process repeats itself for the next half cycle of FIG. 8B, where the negative portion of the AC voltage wave is rectified as a positive voltage.

The LED lighting circuits described herein, using exemplary embodiments, may be 2.3% to 8.1% more efficient than some LED lighting circuits currently used. In addition, the LED lighting circuits described herein, using exemplary embodiments, may have 22.5% to 72.7% higher LED die utilization, and line regulation at +/−10% voltage drops from 35% down to below 10%. In one or more exemplary embodiments, the LED lighting circuits may result in 11% to 42.5% lower LED peak current, suggesting longer lamp life. These efficiency, LED die utilization, line regulation, and voltage drop values may vary based one or more of a number of factors, including but not limited to the specific LED lighting circuit used, the voltage of the LED supply power, the level of current flowing through the LEDs, the number of LEDs, and the resistance of various resistors. One or more exemplary embodiments may also provide a lower thermal run-off risk.

In one or more exemplary embodiments, the electrical efficiency of the LED driver circuits described herein is higher than the electrical efficiency of conventional LED drivers. For example, one or more exemplary LED driver circuits described herein have shown electrical efficiencies of 84.1% whereas conventional LED drivers have electrical efficiencies around 83%. Further, LED driver circuits using one or more exemplary embodiments described herein may also provide much lower line regulation, improved power factor, and improved THD over conventional AC LED technologies.

LED driver circuits using one or more exemplary embodiments described herein may also provide improved LED die utilization compared to conventional AC LED technologies, which means lower LED cost, or more lumen output by the LEDs with the same or similar power ratings. Using one or more exemplary embodiments, LED circuits may use low cost, widely available, LEDs and/or LED modules. For example, a mature (established), higher lumen-per-watt direct current LED chip may be used with exemplary embodiments to achieve many of the benefits (e.g., increased efficiency, increased die utilization) described herein, costing cents rather than dollars.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the present invention is not limited herein.

We claim:

1. An alternating current ("AC")-powered light emitting diode ("LED") driver for driving one or more arrays of series-connected LEDs, comprising:
a first transistor comprising a first collector-emitter path connected in series with at least a first LED of a first array of the one or more arrays of series-connected LEDs;
a second transistor configured to selectively activate the first transistor based on a level of current through the first array of series-connected LEDs;
a second array of the one or more arrays of series-connected LEDs, wherein the second array of series-connected LEDs comprises a second turn-on voltage and is connected in parallel to the first array of series-connected LEDs;
a first current limiting circuit comprising the first transistor and the second transistor, wherein the first current limiting circuit is coupled to the first array of series-connected LEDs, wherein the first current limiting circuit is configured to maintain a first maximum current flowing through the first array of series-connected LEDs, wherein the first maximum current corresponds to a first voltage, wherein the first voltage is greater than the first turn-on voltage; and
a second current limiting circuit comprising a third transistor and a fourth transistor, wherein the second current limiting circuit is coupled to the second array of series-connected LEDs, wherein the second current limiting circuit is configured to maintain a second maximum current flowing through the second array of series-connected LEDs, wherein the second maximum current corresponds to a second voltage, wherein the second voltage is greater than a second turn-on voltage of the second array,
wherein the first array of series-connected LEDs has a first turn-on voltage, and
wherein the first array of series-connected LEDs and the second array of series-connected LEDs are connected to a positive voltage output of a full-wave rectifier, wherein the full-wave rectifier is configured to receive AC power from an AC power source and output a positive voltage representation of the AC power to the first array of series-connected LEDs and to the second array of series-connected LEDs.

2. The AC-powered LED driver of claim 1, further comprising:
a current limiting resistor connected in series with the first array of series-connected LEDs,
wherein the first collector-emitter path of the first transistor is connected in parallel with the current limiting resistor and is configured to at least partially bypass the current limiting resistor when activated.

3. The AC-powered LED driver of claim 2, further comprising a current sensing resistor disposed between the current limiting resistor and ground for providing a bias voltage to a base of the second transistor.

4. The AC-powered LED driver of claim 1, wherein the second transistor comprises a second collector-emitter path disposed between a base of the first transistor and ground such that when the second transistor is activated the first transistor is deactivated.

5. The AC-powered LED driver of claim 1, wherein the first collector-emitter path of the first transistor is further connected in parallel with a second LED of the first array of series-connected LEDs, wherein the first LED and the second LED are different LEDs.

6. The AC-powered LED driver of claim 1, further comprising:
a third transistor comprising a third collector-emitter path connected in parallel with the first transistor and in series with at least the first LED of the first array of series-connected LEDs,
wherein the second transistor is further configured to selectively activate the third transistor based on the level of current through the first array of series-connected LEDs.

7. The AC-powered LED driver of claim 1, wherein the first maximum current and the second maximum current are determined based on one or more parameters of the LED lighting fixture, wherein the one or more parameters of the LED lighting fixture are selected from a group consisting of maintaining a high dimming range, reducing flickering, improving total harmonic distortion, improving efficiency, reducing power consumption, and improving flicker immunity and performance.

8. The AC-powered LED driver of claim 1, wherein the second turn-on voltage is less than the first turn-on voltage, and wherein the second array of series-connected LEDs has substantially no current flowing therethrough when the positive voltage output from the full-wave bridge rectifier is greater than the first turn-on voltage.

9. The AC-powered LED driver of claim 8, wherein the second maximum current flows through the second array of series-connected LEDs between when the positive voltage output from the full-wave bridge rectifier drops below the first turn-on voltage and when the positive output voltage drops below the second turn-on voltage.

10. The AC-powered LED driver of claim 8, wherein each array of the one or more arrays of series-connected LEDs is dimmable.

11. A method for controlling a light emitting diode (LED) lighting circuit, the method comprising:
applying a first voltage to a first array of series-connected LEDs and a second array of series-connected LEDs of the LED lighting circuit, wherein the first voltage exceeds a first threshold voltage, wherein the first threshold voltage turns on the first array of series-connected LEDs;
applying, subsequent to applying the first voltage, an increased voltage to the first array of series-connected LEDs and the second array of series-connected LEDs, wherein the increased voltage exceeds a second threshold voltage, wherein the second threshold voltage turns on the second array of series-connected LED and turns off the first array of series-connected LEDs;
applying, subsequent to applying the increased voltage, a decreased voltage to the first array of series-connected LEDs and the second array of series-connected LEDs, wherein the decreased voltage is greater than the first threshold voltage and less than the second threshold voltage, wherein the decreased voltage turns off the second array of series-connected LED and turns on the first array of series-connected LEDs; and
applying, subsequent to applying the decreased voltage, a second voltage to the first array of series-connected LEDs and the second array of series-connected LEDs, wherein the second voltage is less than the first threshold voltage, wherein the second voltage turns off the first array of series-connected LEDs.

12. The method of claim 11, wherein the first threshold voltage is controlled using a first transistor comprising a collector-emitter path coupled in series with the first array of series-connected LEDs, wherein the first transistor is activated and deactivated using a second transistor electrically coupled to the first transistor.

13. The method of claim 11, wherein the LED lighting circuit is dimmable.

14. The method of claim 11, wherein the first threshold voltage and the second threshold voltage are set to maintain a high dimming range.

15. The method of claim 11, wherein the first threshold voltage and the second threshold voltage are set to reduce flicker effects.

16. The method of claim 11, wherein the first threshold voltage and the second threshold voltage are set to improve total harmonic distortion.

17. An alternating current ("AC")-powered light emitting diode ("LED") driver for driving one or more arrays of series-connected LEDs, comprising:
- a plurality of LED paths connected in parallel with each other, wherein each LED path of the plurality of LED paths comprises one or more arrays of series-connected LEDs;
- a plurality of first transistors, wherein each first transistor of the plurality of first transistors comprises a first collector-emitter path connected in series with a LED path of the plurality of LED paths; and
- a second transistor configured to selectively activate each first transistor of the plurality of first transistors based on a level of current through the respective LED path of the plurality of LED paths,
wherein each of the first array of series-connected LEDs has a first turn-on voltage, further comprising: a plurality of current limiting resistors, wherein each current limiting resistor of the plurality of current limiting resistors is connected in series with a respective LED path of the plurality LED paths, wherein the first collector-emitter path of each of the plurality of first transistors is connected in parallel with a respective current limiting resistor and is configured to, when activated, at least partially bypass the respective current limiting resistor.

18. The AC-powered LED driver of claim 17, wherein the second transistor comprises a base-emitter voltage that is reduced as temperature increases to generate a reduced BE voltage, wherein the reduced BE voltage reduces a current flowing through the first array of series-connected LEDs.

* * * * *